Oct. 19, 1948.  K. M. KELLER ET AL  2,451,746
FEVER THERMOMETER
Filed Nov. 26, 1945
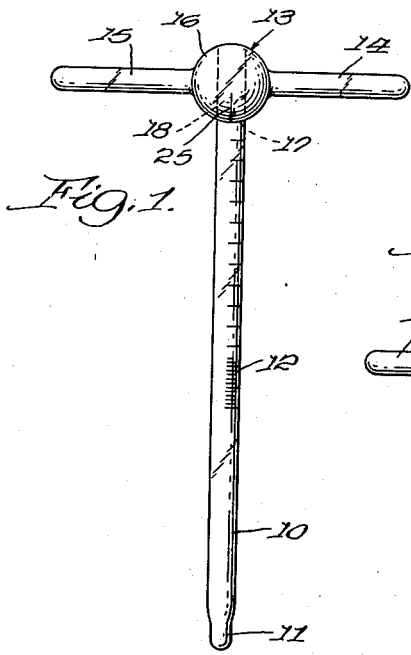
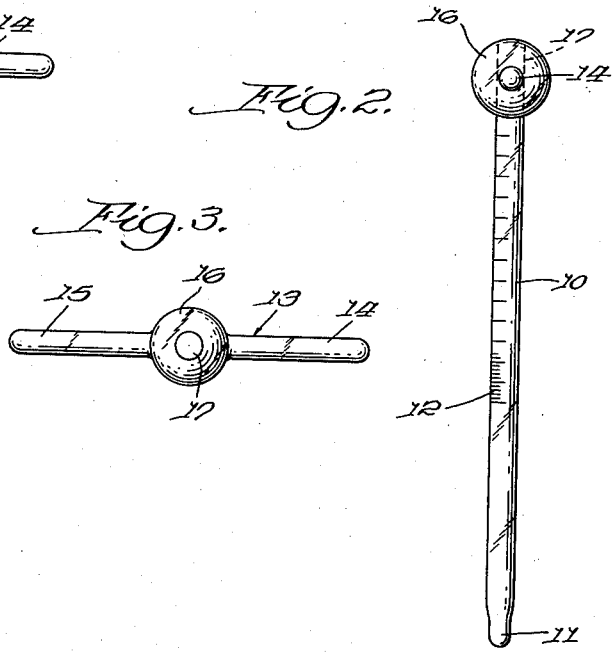
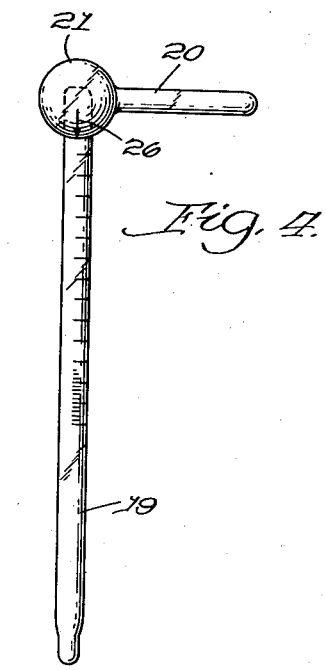
Inventors:
Kathryn M. Keller,
Elizabeth H. Keller
and Anne H. Keller.
By Kenneth T. Snow
Att'y.

Patented Oct. 19, 1948

2,451,746

UNITED STATES PATENT OFFICE 2,451,746

FEVER THERMOMETER

Kathryn M. Keller, Elizabeth H. Keller, and Anne H. Keller, Chicago, Ill.

Application November 26, 1945, Serial No. 630,952

1 Claim. (Cl. 73—373)

This invention relates to a new and improved fever thermometer and has for one of its principal objects the provision of means for causing the mercury to be thrown down into the storage bulb at the base of the thermometer.

An important object of this invention is to provide a cross-handle for a fever thermometer.

Another important object of this invention is to provide an integral glass cross-handle for glass fever thermometers.

A further important object of this invention is to provide a glass cross-member adapted to receive a standard fever thermometer therein wherein a cementing of the thermometer and cross-handle forms an integral unit.

A still further important object of this invention is the provision of a glass fever thermometer having integral glass handles formed as a unit with the tubular thermometer.

Another and still further important object of this invention is to provide a fever thermometer with a means for throwing down the thermometer solution and to provide one which may be readily sterilized in the regular manner.

Other and further important objects of this invention will become apparent from the disclosures in the following specification and accompanying drawing in which:

Figure 1 is a front elevational view of the fever thermometer of this invention;

Figure 2 is a side elevational view of the thermometer as shown in Figure 1;

Figure 3 is a top plan view of the device as shown in Figures 1 and 2;

Figure 4 shows a modified form of fever thermometer.

As shown in the drawing:

The reference numeral 10 indicates generally a glass tubular fever thermometer having a lower bulb portion 11 carrying a solution of mercury and alcohol and having calibrations 12 along the upper portion thereof to indicate the height of the thermometer solution of mercury and alcohol.

Fever thermometers as universally used both in hospitals and homes must be treated with great care. First they must be sterilized and yet they cannot be boiled as most articles can be. Therefore these thermometers must be immersed in an antiseptic solution capable of sterilizing the article without raising the temperature thereof inasmuch as raising of the temperature would destroy the use of the thermometer. Secondly, after the temperature of a person has been recorded it is necessary to cause the mercury or solution of mercury and alcohol to be lowered to its place of storage in the bulb 11. In order to lower the mercury it is common practice to shake the thermometer by a throwing motion of the arm and maintaining a firm grip on the thermometer. Manufacturers of thermometers advise against a jerking or a sudden stopping of the thermometer during throwing of the arm. A good fever thermometer requires a great deal of effort to lower the mercury. In many instances the hospital patients are required to take their own temperatures and must necessarily shake down the mercury after each reading. This is especially true in tuberculosis sanatariums where it is essential that temperature recordings be made numerous times throughout the day. Basically it is bad for tubercular patients to make the exertion necessary to lower the mercury. It was with these two things in mind that the thermometer of this invention was developed.

In order to provide a fever thermometer which is capable of being readily sterilized and also one which may have its solution readily lowered, the subject fever thermometer has been made entirely of glass and is equipped with an integral cross-member 13 having handles 14 and 15. A central portion 16 of the cross-member 13 is provided with a socket 17 for the reception of an upper end 18 of the tubular thermometer 10. A glass cement is then applied between the thermometer portion 18 and the socket 17 of the cross-member 13 so that the cross-member 13 and the thermometer 10 become a single integral unit which may be sterilized and which will contribute to the lowering of the thermometer solution without being changed in any manner. The socket 17, as shown in Figure 1, runs entirely through the spherical central portion 16 of the cross-member 13 so that the cross-member may be positioned at any height along the length of the tubular thermometer 10. The socket 17, however, need not be a complete bore through the spherical portion 16 but may cease at any point. The length of the bore is determined only by the amount necessary to insure a good firm joint between the tubular portion 10 and the cross-member 13. With the present standard thermometer it is a requirement that all the calibrated figures on the thermometer be open to view, and hence the cross-member 13 is positioned at the top of the tube 10 in the manner shown in Figures 1, 2, and 3. In order to lower the thermometer solution the handles 14 and 15 are gripped in the right and left hands, respectively, between the thumb and forefinger. The tubular portion 10 is initially rotated in an upward position, and movement of the fingers to cause the tube 10 to swing downwardly will create sufficient centrifugal force to throw the mercury down into the bulb 11. The rotation of the tube 10 must be made relatively fast in order to throw down the mercury. The action should be repeated until the mercury is down sufficiently low.

As shown in Figure 4, a thermometer 19 is equipped with a handle 20 having a thermometer engaging portion 21 similar to the central portion 16 of the cross-member 13 as shown in Figures 1, 2, and 3. One of the handles such as shown in Figure 1 has been eliminated. Under some conditions a single handle 20 such as shown in Figure 4 will be sufficient to cause rotation of the thermometer and a centrifugal outward throwing of the thermometer solution. Both of the handles shown in Figures 1 and 4 may be mounted so that readings of the thermometer may be viewed when the handles 14 and 20 are held in the right hand. This eliminates much turning of the thermometer 19 in an effort to find the side at which the reading may be taken. In order to further facilitate the reading of the thermometer an indicating mark is placed on the cross-member as shown at 25 in Figure 1 and on the handle member 20 as shown at 26 in Figure 4. The thermometer using this device is readily readable.

The material has been designated as glass inasmuch as glass is conducive to sterilization and is the recognized material for making thermometers. However, transparent plastic materials such as lucite may be used to equal advantage with the glass material.

Numerous details of construction may be varied throughout a wide range without departing from the principles disclosed herein, and we therefore do not propose limiting the patent granted hereon otherwise than as necessitated by the appended claim.

What is claimed is:

A fever thermometer comprising a glass tube containing a thermosensitive fluid and a bored transverse member of glass for rotating the glass tube, the surface of the bore of which intimately engages the entire circumferential surface of the tube adjacent an end thereof, said tube and transverse member being permanently joined at such engaging surface.

KATHRYN M. KELLER.
ELIZABETH H. KELLER.
ANNE H. KELLER.

REFERENCES CITED

The following references are of record in the file of this patent:

UNITED STATES PATENTS

| Number | Name | Date |
|---|---|---|
| 1,034,735 | Ruckstuhl | Aug. 6, 1912 |
| 1,782,599 | Boutin | Nov. 25, 1930 |
| 1,903,432 | Akashi | Apr. 11, 1933 |
| 1,999,427 | Thoren | Apr. 30, 1935 |
| 2,047,801 | Russell | July 14, 1936 |
| 2,084,875 | Thoren | June 22, 1937 |

FOREIGN PATENTS

| Number | Country | Date |
|---|---|---|
| 23,500 | Great Britain | Nov. 15, 1905 |